(12) United States Patent
Drake

(10) Patent No.: US 11,926,183 B2
(45) Date of Patent: Mar. 12, 2024

(54) DUAL MODE VEHICLE THAT OPERATES ON BOTH GUIDED RAILS AND UNGUIDED ROADWAYS

(71) Applicant: Owen G. Drake, San Francisco, CA (US)

(72) Inventor: Owen G. Drake, San Francisco, CA (US)

( * ) Notice: Subject to any disclaimer, the term of this patent is extended or adjusted under 35 U.S.C. 154(b) by 755 days.

(21) Appl. No.: 17/125,259

(22) Filed: Dec. 17, 2020

(65) Prior Publication Data

US 2021/0101430 A1    Apr. 8, 2021

Related U.S. Application Data

(63) Continuation-in-part of application No. 16/742,554, filed on Jan. 14, 2020, now Pat. No. 11,331,971.

(Continued)

(51) Int. Cl.

| B60F 1/02 | (2006.01) |
|---|---|
| B60K 17/356 | (2006.01) |
| B60L 9/00 | (2019.01) |
| B61F 3/04 | (2006.01) |
| B60L 53/16 | (2019.01) |

(Continued)

(52) U.S. Cl.
CPC .............. B60F 1/02 (2013.01); B60K 17/356 (2013.01); B60L 9/00 (2013.01); B60L 53/16 (2019.02); B61C 3/00 (2013.01); B61C 7/00 (2013.01); B61F 3/04 (2013.01); B62D 24/04 (2013.01)

(58) Field of Classification Search
CPC .. B62D 24/04; B61C 7/00; B61C 3/00; B60F 1/00; B60F 1/005; B60F 1/02; B60F 1/04; B60F 1/046; B60F 1/043; B60F 2301/04; B61F 3/04; B60K 17/356; B60L 53/16; B60L 9/00
See application file for complete search history.

(56) References Cited

U.S. PATENT DOCUMENTS

| 2,002,901 A * | 5/1935 | Main ....................... B60F 1/043 |
| | | 180/401 |
| 2,010,617 A * | 8/1935 | Willeme ................... B60F 1/02 |
| | | 295/8.5 |

(Continued)

FOREIGN PATENT DOCUMENTS

| CN | 208947009 U | 6/2019 |
| CN | 111497538 A | 8/2020 |

(Continued)

*Primary Examiner* — Scott A Browne

(57) ABSTRACT

A dual mode vehicle that operates on guided rails and roadways includes a capsule, a carriage, a front left drive system, a front right drive system, a rear left drive system, a rear right drive system, a pod control unit, and at least one battery. The carriage includes a spherical frame-housing and a base. A spherical cabin of the capsule is attitudinally mounted within the spherical frame-housing. The front left drive system, the front right drive system, the rear left drive system, and the rear right drive system each includes a motor, a drive axle, a road wheel, and a rail wheel. The road wheel and the rail wheel are axially mounted to the drive axle. The motor that is mounted to the base is operatively coupled with the drive axle through the at least one battery and the pod control unit to operate a roadway or railway transportation mode.

12 Claims, 12 Drawing Sheets

Related U.S. Application Data

(60) Provisional application No. 62/792,285, filed on Jan. 14, 2019.

(51) Int. Cl.
    *B61C 3/00* (2006.01)
    *B61C 7/00* (2006.01)
    *B62D 24/04* (2006.01)

(56) References Cited

U.S. PATENT DOCUMENTS

| | | | | |
|---|---|---|---|---|
| 2,267,254 | A | * | 12/1941 | Reilley ............... B60F 3/00 180/21 |
| 2,718,195 | A | * | 9/1955 | Bock ............... B60F 1/043 105/72.2 |
| 3,905,323 | A | * | 9/1975 | Kacere ............... B63H 1/38 180/219 |
| 4,791,871 | A | * | 12/1988 | Mowll ............... B60L 5/40 104/94 |
| 5,289,778 | A | * | 3/1994 | Romine ............... B61B 15/00 105/72.2 |
| 6,298,934 | B1 | | 10/2001 | Shteingold |
| 6,810,817 | B1 | | 11/2004 | James |
| 2004/0237831 | A1 | * | 12/2004 | Tremblay ............... B60B 37/00 105/72 |
| 2007/0028798 | A1 | | 2/2007 | Langenbeck |
| 2020/0223268 | A1 | | 7/2020 | Drake |

FOREIGN PATENT DOCUMENTS

| | | |
|---|---|---|
| RU | 2551774 C1 | 5/2015 |
| RU | 173152 U1 | 8/2017 |
| RU | 2733672 C1 | 10/2020 |
| WO | WO1991018777 A1 | 12/1991 |
| WO | WO2017206905 A1 | 12/2017 |

* cited by examiner

DUAL MODE VEHICLE THAT OPERATES ON BOTH GUIDED RAILS AND UNGUIDED ROADWAYS

The current application is a continuation-in-part (CIP) application of a U.S. non-provisional application Ser. No. 16/742,554 filed on Jan. 14, 2020. The U.S. non-provisional application Ser. No. 16/742,554 claims a priority to a U.S. provisional application Ser. No. 62/792,285 filed on Jan. 14, 2019.

FIELD OF THE INVENTION

The present invention relates generally to a transportation vehicle. More specifically, the present invention relates to a dual mode vehicle which operates on both guided rails and unguided roadways with two different drive modes.

BACKGROUND OF THE INVENTION

Transportation system usually includes transportation infrastructure and vehicles. Modern transportation infrastructure includes roadways, railways, airways, waterway, etc. Among others, roadways and railways are the most important ways to move passengers and freight. However, they are also burdened by many disadvantages. For roadways systems, such as the highway system, safety is a significant concern due to the fact that the roadways are traveled by personally owned and driven vehicles. The speeds and directions of the vehicles are determined solely by the judgment or desire of the driver. Moreover, conventional roadways systems also suffer from the drawbacks of traffic jams and inefficient use of energy resources.

Trains usually include multiples of passenger or freight cars which are hauled by a separate locomotive. Trains are beneficial in that they travel on guided rails and thus are safe to travel on. However, railway transport cannot provide door to door service as they are tied to a particular track. The routes and timings of the trains are usually fixed and cannot be adjusted according to individual requirements. Also, railway transport is unsuitable and uneconomical for short distance and small loads due to the high operating cost.

The present invention aims to solve some of these problems by disclosing a dual mode vehicle which benefits from both the roadways transportation system and railways transportation system. More specifically, the present invention is a battery powered vehicle and utilizes a retractable wheel assembly system to drive on roadways and an integrated rail mount system to drive on railways.

SUMMARY OF THE INVENTION

The present invention is a dual mode vehicle which can operate with two different drive modes. In a second operational mode, the vehicle functions as an electrically operated pod and travels along two elevated rails or a pair of conventional railways. In a first operational mode, the vehicle is able to act as a wheeled electric car to travel on conventional roadways. The present invention has the advantages of simple transition to and from the rails, comfort, and improved safety.

DETAIL DESCRIPTIONS OF THE INVENTION

All illustrations of the drawings are for the purpose of describing selected versions of the present invention and are not intended to limit the scope of the present invention.

Figure 1:
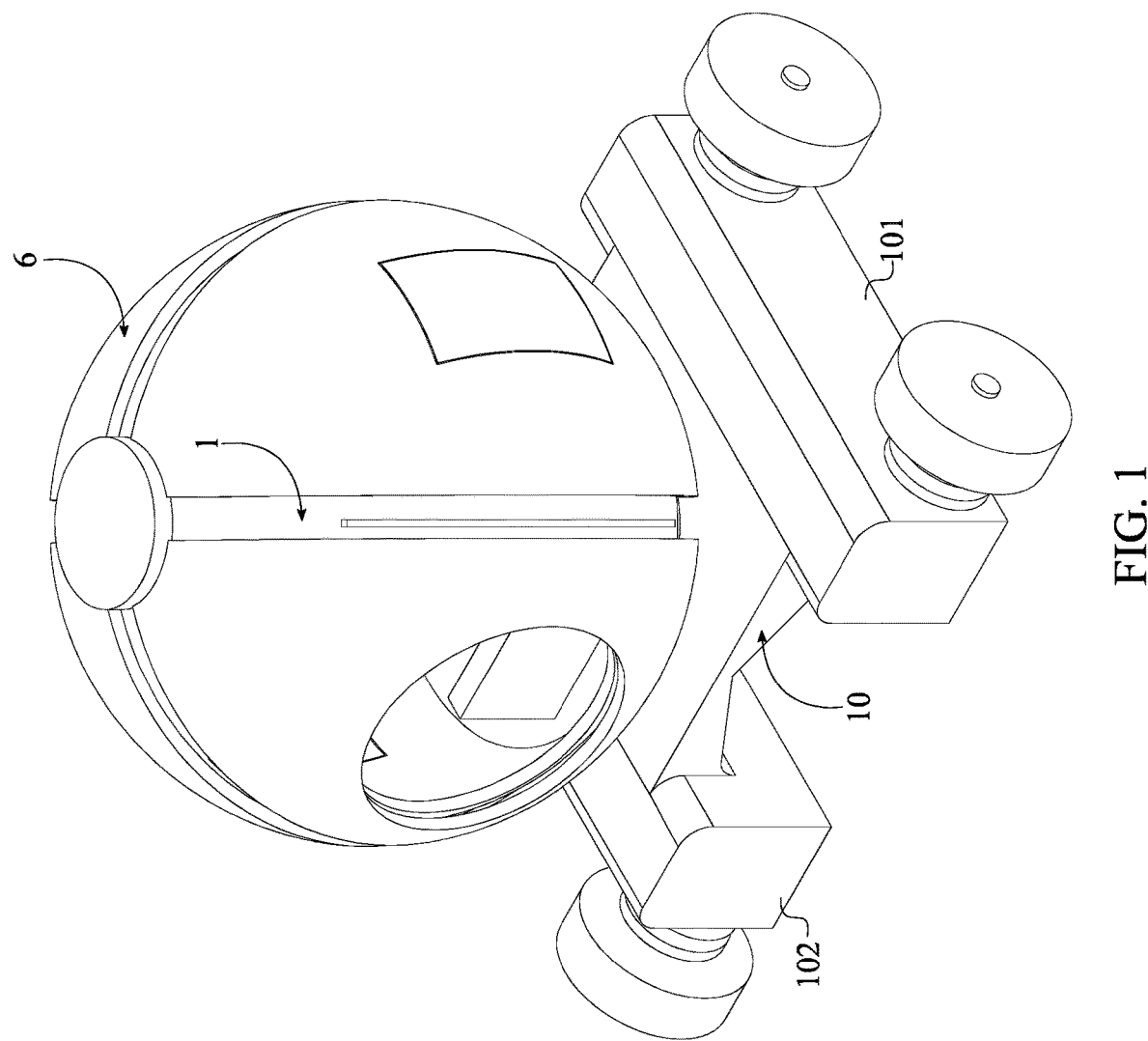
FIG. 1 is a top perspective view for an exemplary embodiment of the present invention.
Figure 2:
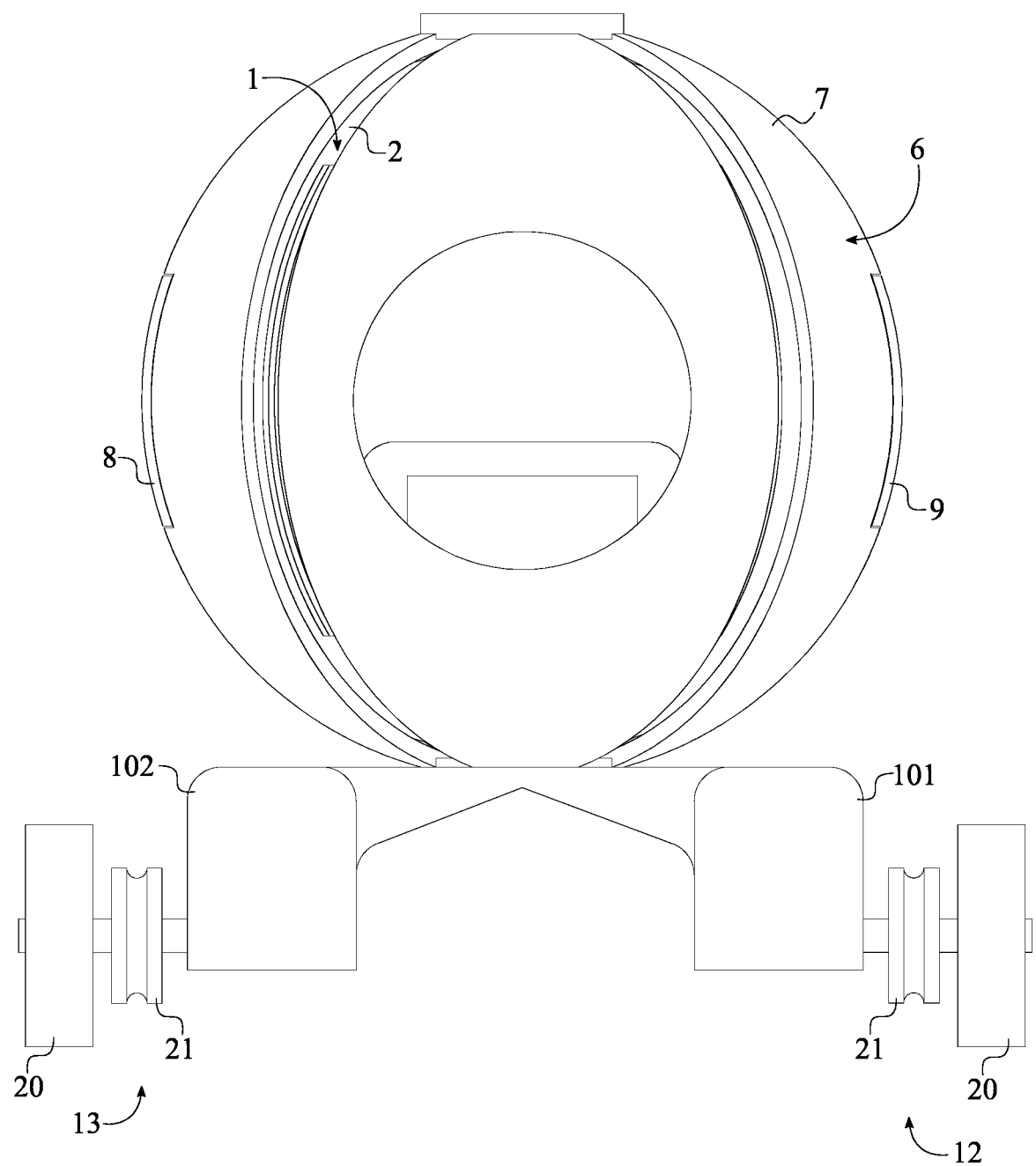
FIG. 2 is a front view for an exemplary embodiment of the present invention.

The present invention is designed to provide a vehicle which can travel on both elevated railways and conventional roadways. In a first operational mode, the present invention functions as a wheeled electric car that can travel on conventional roadways. In a second operational mode, the present invention functions as an electrically operated pod that is guided along a pair of rails. The present invention comprises a capsule 1, a carriage 6, a front left drive system 12, a front right drive system 13, a rear left drive system 14, a rear right drive system 15, a pod control unit 27, and at least one battery 29 as shown in FIG. 1-6. The carriage 6 comprises a spherical frame-housing 7 and base 10 as shown in FIG. 2. The front left drive system 12, the front right drive system 13, the rear left drive system 14, and the rear right drive system 15 each comprising a motor 16, a drive axle 19, a road wheel 20, and a rail wheel 21 as shown in FIG. 9-12.

In reference to a general configuration of the present invention, a spherical cabin 2 of the capsule 1 is attitudinally mounted within the spherical frame-housing 7 so that the spherical cabin 2 can be freely rotated within the spherical frame-housing 7. The front left drive system 12 and the rear left drive system 14 are mounted to a left section 101 of the base 10 so that the left side of the present invention can be independently operated within the first operation mode or the second operational mode. Similarly, the front right drive system 13 and the rear right drive system 15 are mounted to a right section 102 of the base 10 so that the right side of the present invention can be independently operated within the first operation mode or the second operational mode. More specifically, the road wheel 20 and the rail wheel 21 are axially mounted to the drive axle 19 as the motor 16 is operatively coupled with the drive axle 19 through the at least one battery 29 and the pod control unit 27. In other words, the motor 16 for the front left drive system 12, the front right drive system 13, the rear left drive system 14, and the rear right drive system 15 is able to independently power the present invention thus stabilizing the movement of the spherical frame-housing 7 along the pair of rails or the conventional roadways.

The capsule 1 is a structural member that is positioned within the carriage 6 so that the users of the present invention can be accommodated. In reference to FIG. 5, the capsule 1 further comprising at least one seat 3, a first door 4, and a second door 5 in addition to the spherical cabin 2. The spherical cabin 2 is a rigid body and functions similar to cabin of a vehicle. The at least one seat 3 is mounted within the spherical cabin 2 thus providing seating arrangements for the users of present invention. The at least one seat 3 can be a bench seat or a bucket seat, wherein the type and the exact placement of seat and is determined upon the specific usage of the present invention. The at least one seat 3 is preferably equipped with industry standard safety and comfort accessories such as seat belts, headrests, seat heaters, seat air-conditioning, multi-positioning power seat features, and any other types of seat related features. Optionally, the capsule 1 can eliminate the at least one seat 3 to accommodate wheelchairs or freights. The first door 4 and the second door 5 are hermetically integrated into the spherical cabin 2 and diametrically opposed of each other about the spherical cabin 2. The first door 4 and the second door 5 function as multiple access points for the inside of the spherical cabin 2. Resultantly, the users can get in and out of the spherical cabin 2 through the first door 4 and the second door 5 when the present invention is stationary. Furthermore, the first door 4 and the second door 5 can be manually or automatically operated within the present invention according the vehicular industry regulations.

Figure 5:
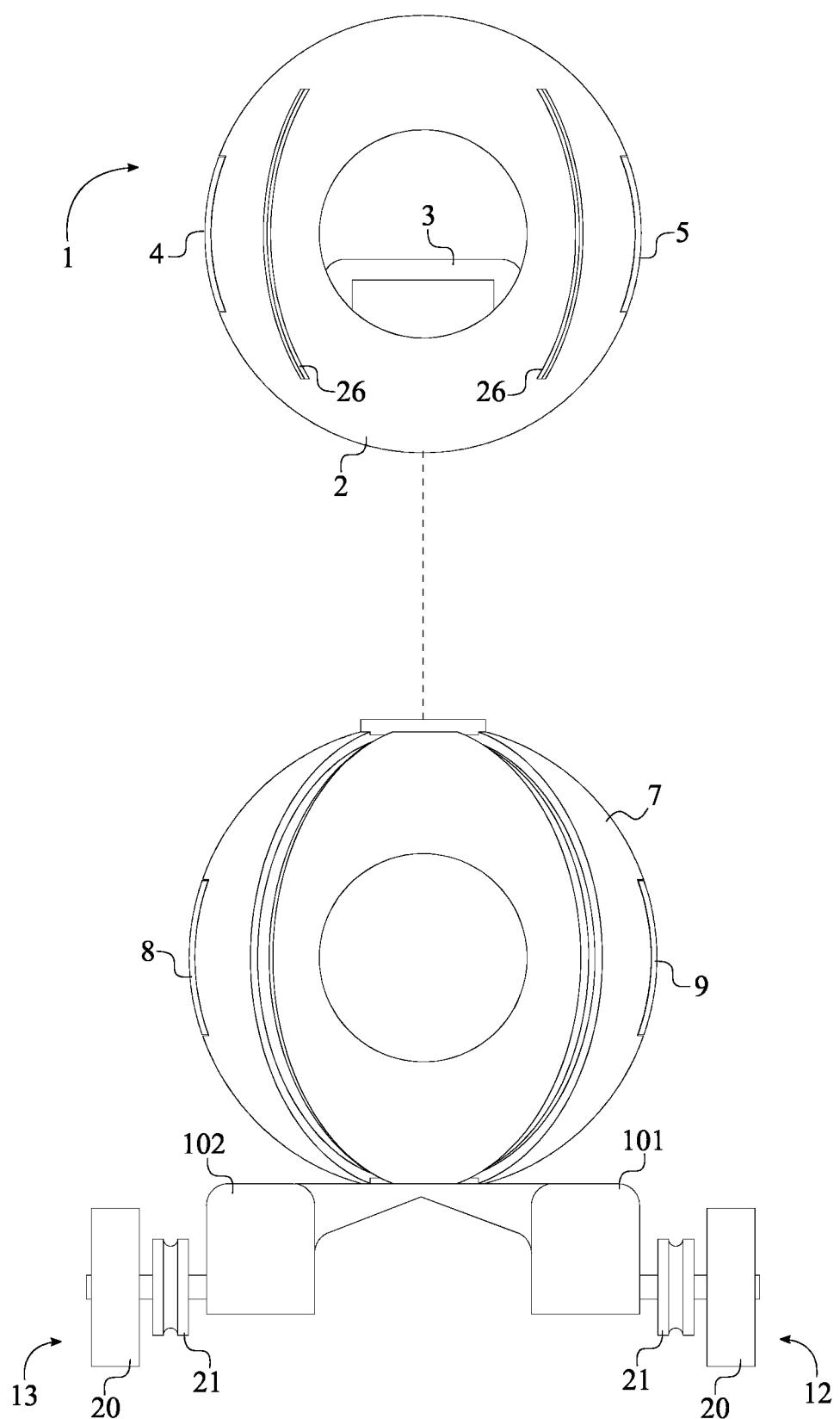
FIG. 5 is a front exploded view for an exemplary embodiment of the present invention, wherein the capsule is separated from the carriage.
Figure 6:
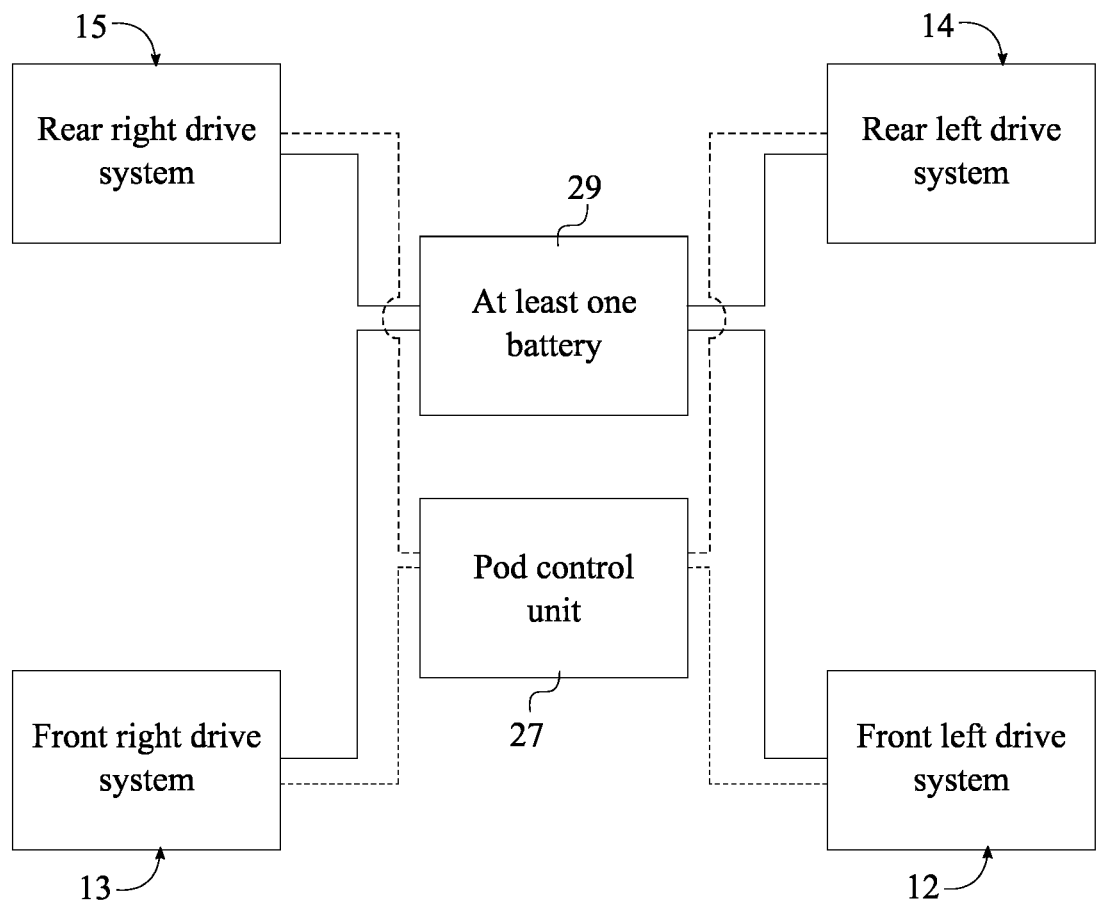
FIG. 6 is a basic schematic view showing the overall operation of the present invention.

The carriage 6 that structurally secures the capsule 1 further comprises a third door 8 and a fourth door 9 as shown in FIG. 5. The spherical cabin 2 is enclosed by the spherical frame-housing 7 so that the spherical cabin 2 can be rotated within the spherical frame-housing 7. The third door 8 and the fourth door 9 are hermetically integrated into the spherical frame-housing 7 and diametrically opposed of each other about the spherical frame-housing 7. More specifically, the third door 8 is designed to be aligned with the first door 4 so that the users of the present invention can move in and out into the spherical cabin 2 through the spherical frame-housing 7. The alignment between the first door 4 and the third door 8 is only functional when the present invention is at a stationary position thus eliminating accidental opening of the first door 4 during an operational position of the present invention. The fourth door 9 is designed to be aligned with the second door 5 so that the users of the present invention can move in and out into the spherical cabin 2 through the spherical frame-housing 7. The alignment between the second door 5 and the fourth door 9 is only functional when the present invention is at a stationary position thus eliminating accidental opening of the second door 5 during an operational position of the present invention. Preferably, the spherical frame-housing 7 is made of hollow tubular bodies, such that electrical conduits, pneumatic lines, and other necessary components can travel therein.

Figure 3:
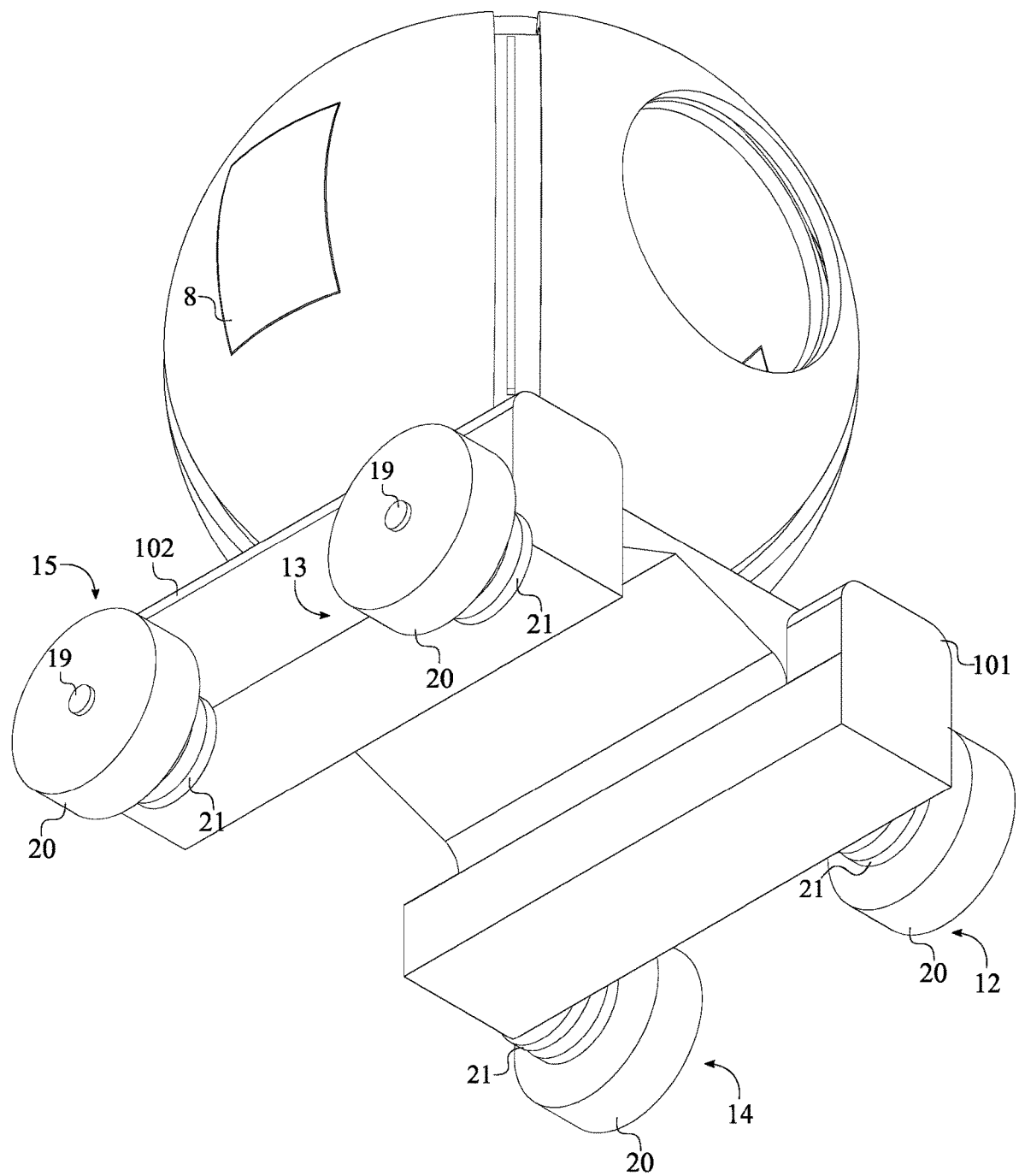
FIG. 3 is a bottom perspective view for an exemplary embodiment of the present invention.
Figure 4:
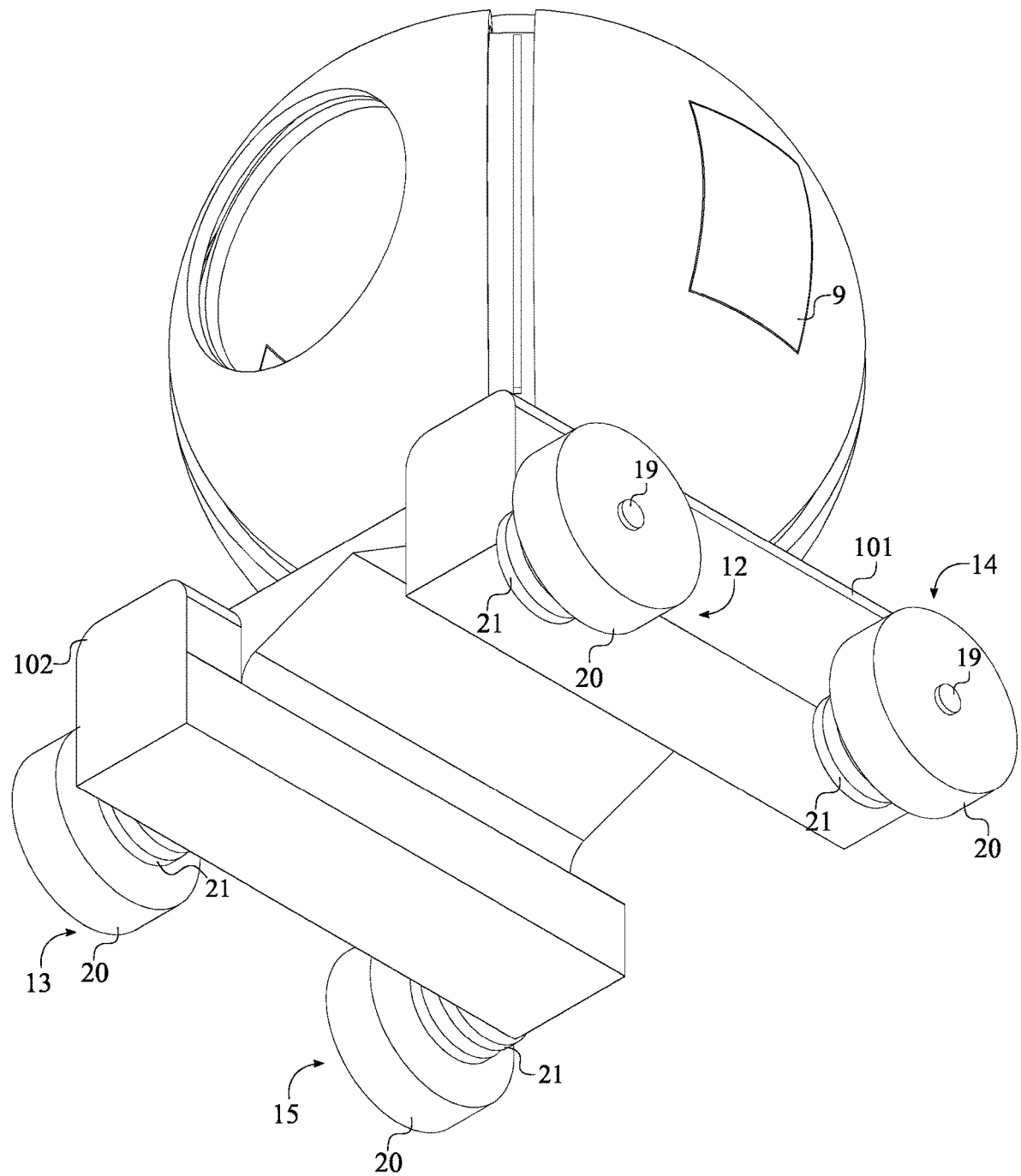
FIG. 4 is a bottom perspective view for an exemplary embodiment of the present invention.

In reference to FIG. 3-4, the left section 101 is configured to mount the front left drive system 12 and the rear left drive system 14 to the present invention and functions as a structural chassis. Similarly, right section 102 is configured to mount the front right drive system 13 and the rear right drive system 15 to the present invention and functions as a structural chassis. The left section 101 and the right section 102 are externally connected to the spherical frame-housing 7 and diametrically opposed of each other about the spherical frame-housing 7. The left section 101 and the right section 102 are preferably formed into an elongated rectangular shape so that the front left drive system 12, the front right drive system 13, the rear left drive system 14, and the rear right drive system 15 can be operatively mounted to the present invention.

Figure 7:
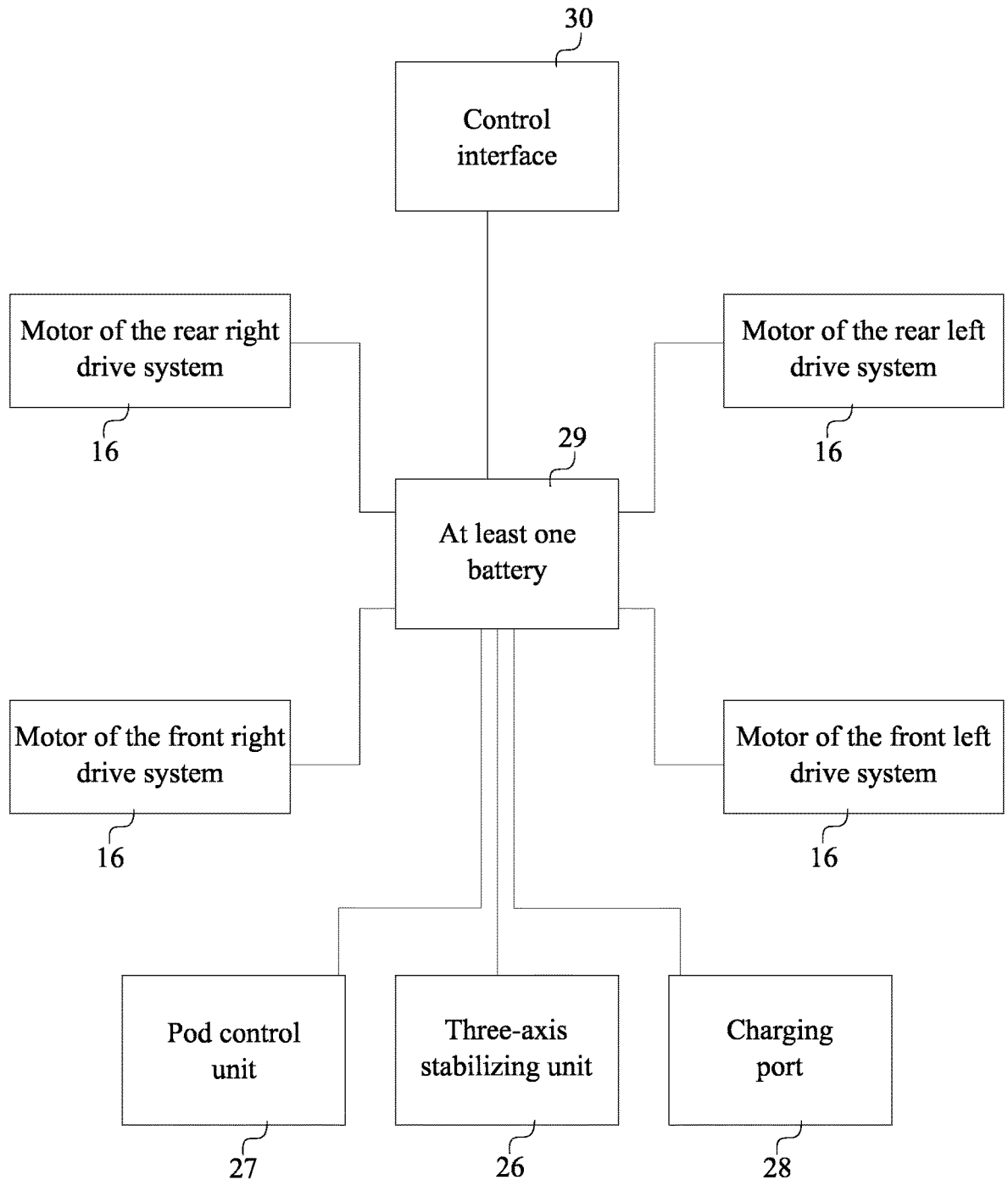
FIG. 7 is a basic schematic view showing the electrical connections of the present invention.
Figure 8:
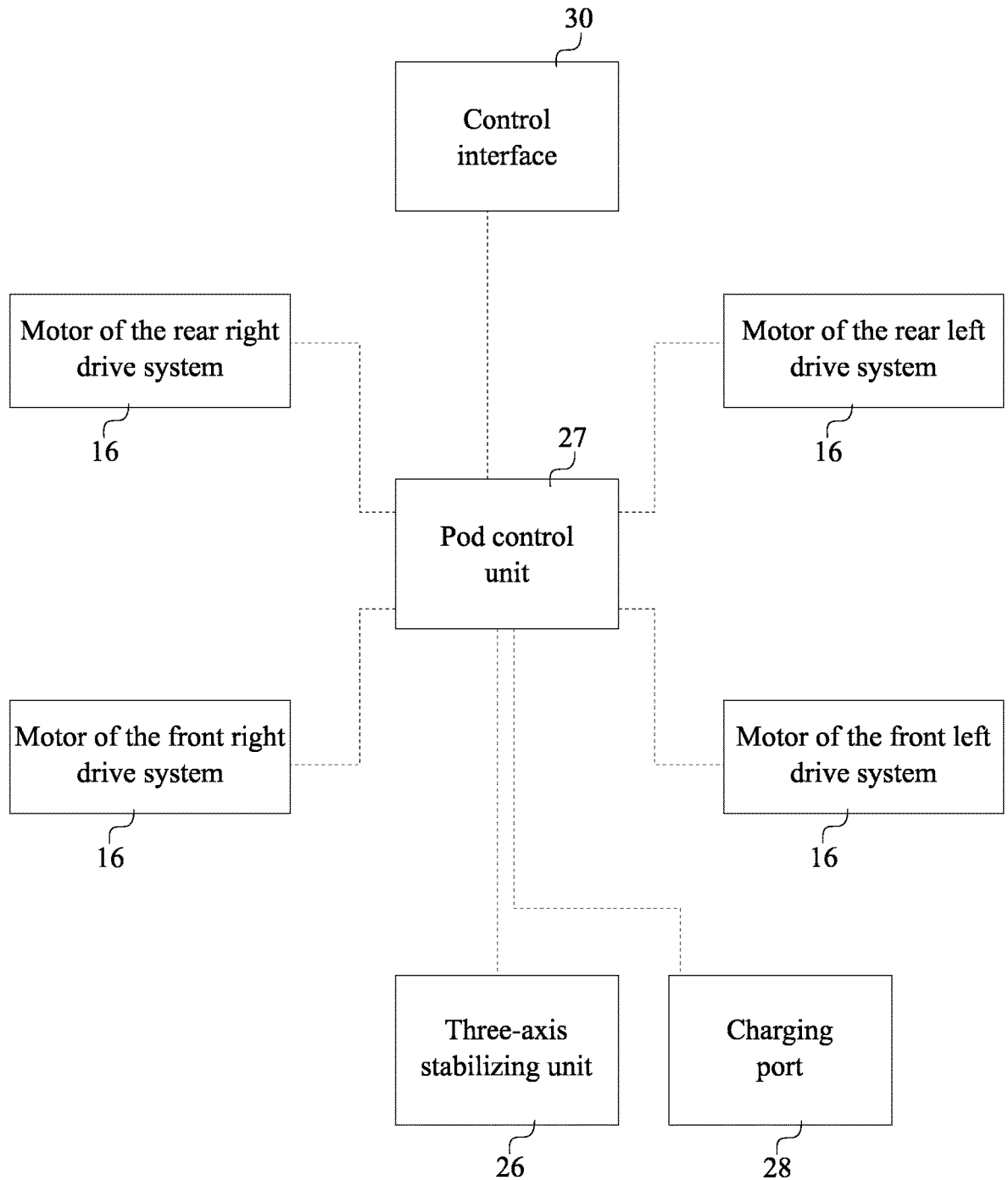
FIG. 8 is a basic schematic view showing the electronical connections of the present invention.
Figure 9:
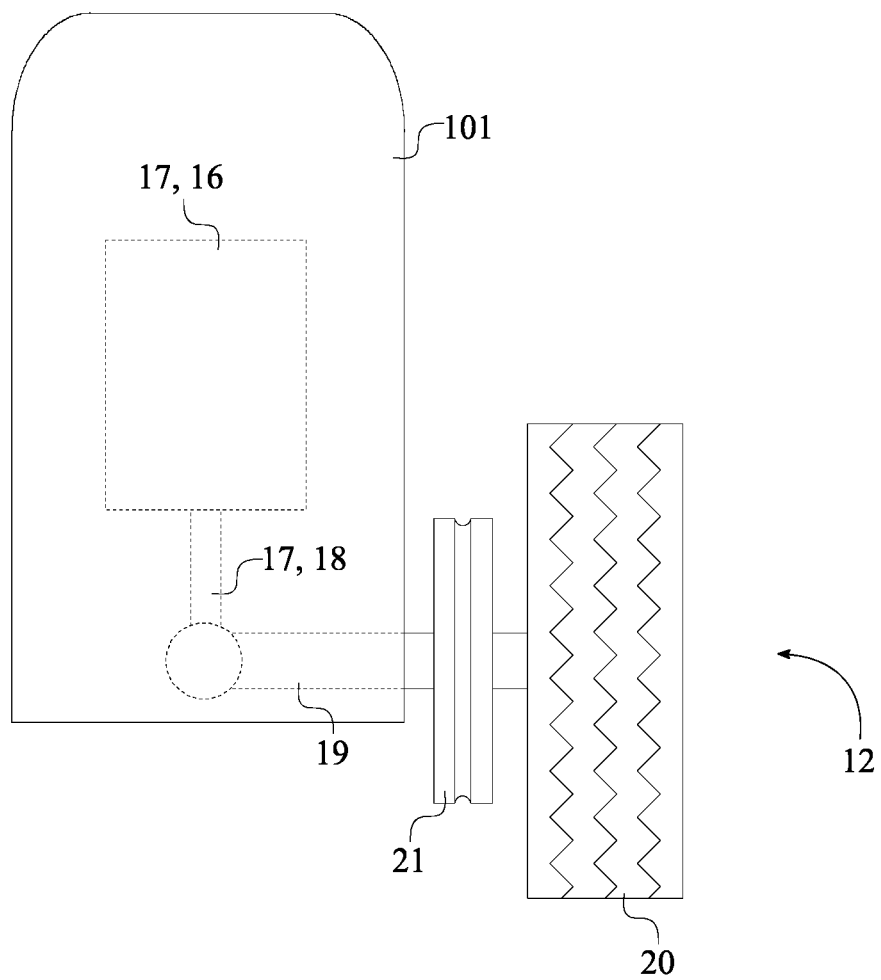
FIG. 9 is a basic schematic view showing the torsional connection between the motor, the rail wheel, and the road wheel of the front left drive system of the present invention.
Figure 10:
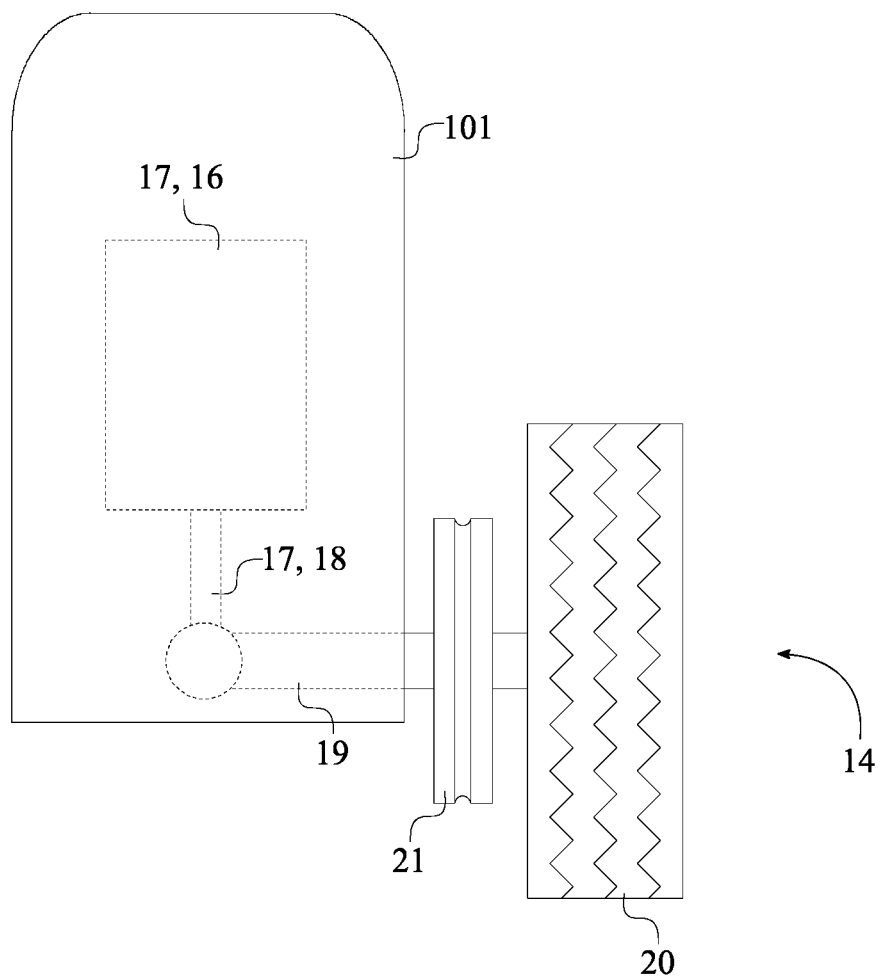
FIG. 10 is a basic schematic view showing the torsional connection between the motor, the rail wheel, and the road wheel of the rear left drive system of the present invention.
Figure 11:
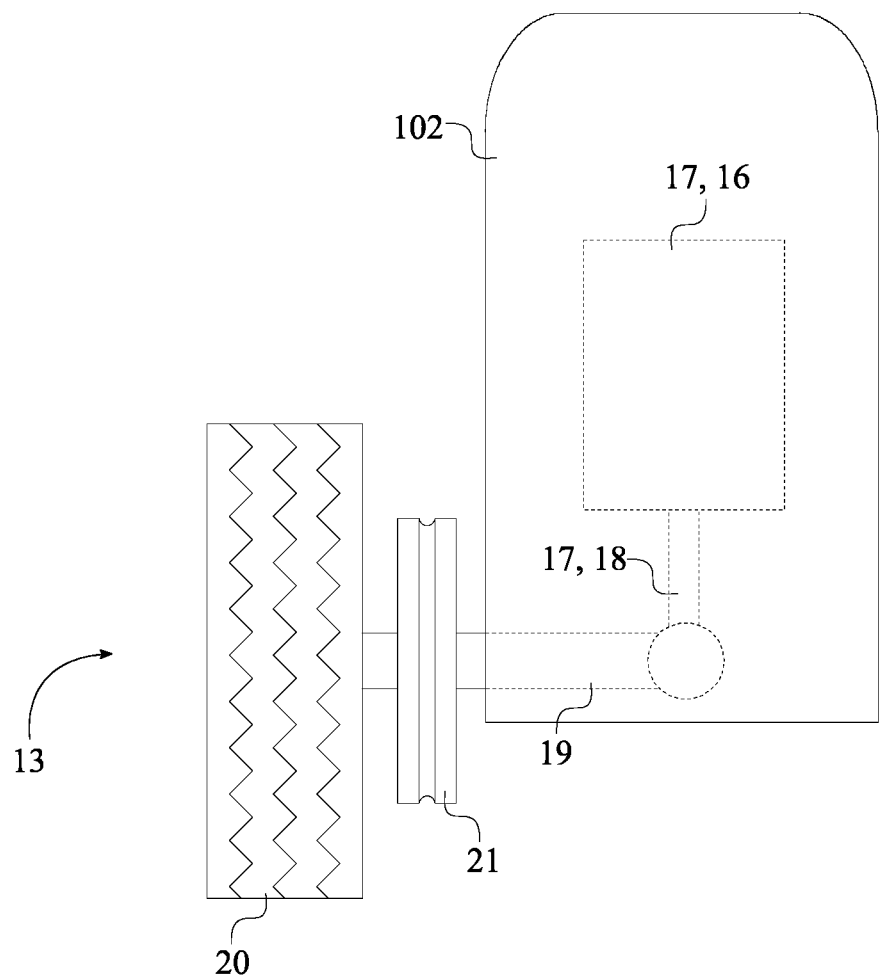
FIG. 11 is a basic schematic view showing the torsional connection between the motor, the rail wheel, and the road wheel of the front right drive system of the present invention.
Figure 12:
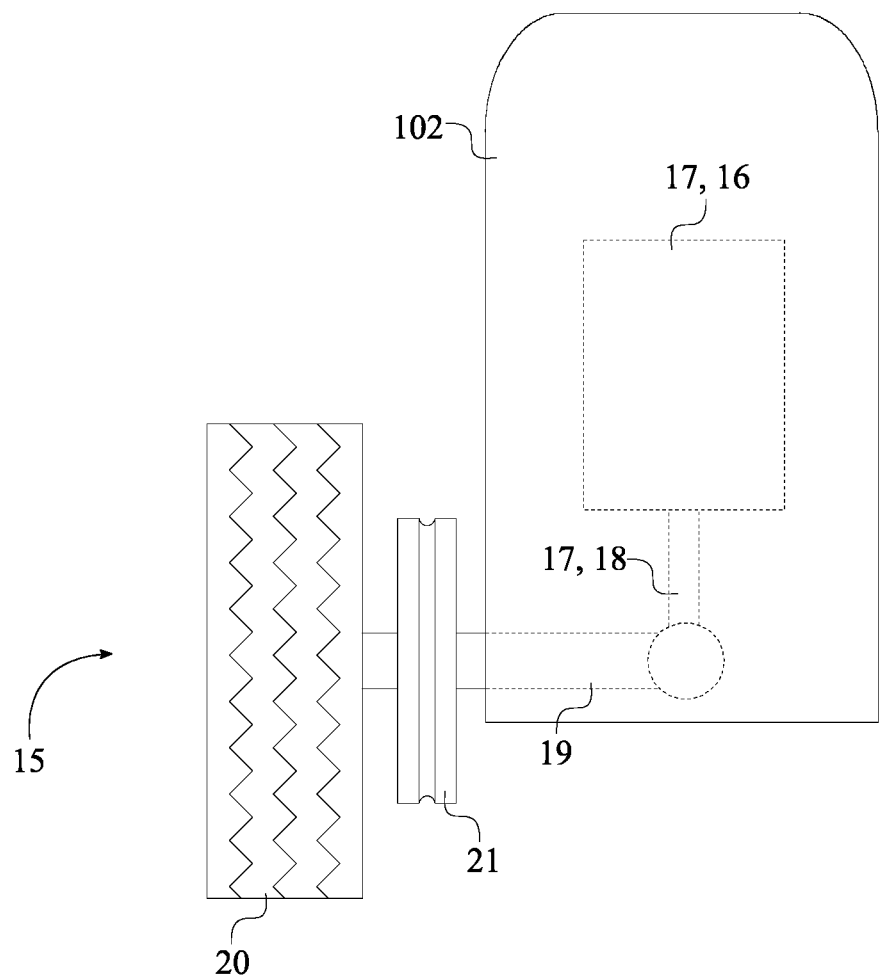
FIG. 12 is a basic schematic view showing the torsional connection between the motor, the rail wheel, and the road wheel of the rear right drive system of the present invention.

In reference to FIG. 7-8, the present invention further comprises a control interface 30 that functions as a graphical user interface. The control interface 30 is utilized within the present invention so that the user of the present invention can input all of the operational commands. The control interface 30 is mounted within the spherical cabin 2 and positioned adjacent to the at least one seat 3, allowing easy access for the users. The control interface 30 is electrically connected to the at least one battery 29 and electronically connected to the pod control unit 27 to fully execute the operational commands of the present invention. More specifically, once the operational commands are inputted through the control interface 30, the operational commands are electronically sent and executed through the pod control unit 27. For example, when the operation of the road wheel 20 is selected through the control interface 30, the pod control unit 27 activates the road wheel 20 and deactivates operational statues of the rail wheel 21 so that the present invention can be operational within conventional roads. When the operation of the rail wheel 21 is selected through the control interface 30, the pod control unit 27 activates the rail wheel 21 and deactivates operational statues of the road wheel 20 so that the present invention can be operational within conventional railways or any other pair of rails.

The pod control unit 27 functions similar to electronic control unit of vehicle. As a result, the pod control unit 27 is able to control and implement vehicular electrical systems of the present invention. The at least one battery 29 is electrically connected to the pod control unit 27, as shown in FIG. 7-8, so that the pod control unit 27 can be powered within the present invention.

The present invention further comprises a charging port 28 as shown in FIG. 7-8. The charging port 28 is electrically connected to the at least one battery 29 so that the at least one battery 29 can be charged with an external electrical charger or charging station. The charging port 28 is electronically connected to the pod control unit 27 so that overcharging of the at least one battery 29 can be eliminated. For example, when the at least one battery 29 is fully charged through an external electrical charger or charging station, the pod control unit 27 detects that the battery 29 is fully charged and stops the charging process to eliminate overcharging of the at least one battery 29.

The present invention further comprises a three-axis stabilizing unit 26 that functions as an attitude control in which the capsule 1 is held fixed in the desired orientation without any rotation while the carriage 6 spins and rotates around the capsule 1. Preferably, propulsion system thrusters are utilized within the present invention as the three-axis stabilizing unit 26 to maintain a fixed position for the capsule 1. In reference to FIG. 5 and FIG. 7-8, the three-axis stabilizing unit 26 is mounted onto the spherical cabin 2. The three-axis stabilizing unit 26 is electrically connected to the at least one battery 29 and electronically connected to the pod control unit 27. As a result, when the present invention is operational, the pod control unit 27 is able to continuously identify the orientation of the capsule 1 with respect to the orientation of the carriage 6 so that the continuous operation of the three-axis stabilizing unit 26 can maintain a fixed position for the capsule 1. For example, the capsule 1 is held fixed in the desired orientation without any rotation while the carriage 6 spins and rotates around the capsule 1 to accommodate the configuration of the pair of rails when the present invention is in the second operational mode.

The motor 16 of the front left drive system 12, the front right drive system 13, the rear left drive system 14, and the rear right drive system 15 functions as the primary drivetrain of the present invention during the first operational mode and the second operational mode. In reference to FIG. 7-8, The motor 16 of the front left drive system 12, the front right drive system 13, the rear left drive system 14, and the rear right drive system 15 is electrically connected to the at least one battery 29 thus converting the electrical energy to rotational kinetic energy. Furthermore, the motor 16 of the front left drive system 12, the front right drive system 13, the rear left drive system 14, and the rear right drive system 15 is electronically connected to the pod control unit 27, wherein the pod control unit 27 selectively operates the front left drive system 12, the front right drive system 13, the rear left drive system 14, and the rear right drive system 15 according user's inputs and the three-axis stabilizing unit 26. For example, rotational direction of the motor 16 is controlled through the pod control unit 27 as the at least one battery 29 continuously powers the motor 16 of the front left drive system 12, the front right drive system 13, the rear left drive system 14, and the rear right drive system 15.

In reference to FIG. 9-12, the drive axle 19 for the front left drive system 12 and the rear left drive system 14 are rotatably mounted to the left section 101. The drive axle 19 for the front right drive system 13 and the rear right drive system 15 are rotatably mounted to the right section 102. The drive axle 19. The motor 16 and the road wheel 20 are oppositely positioned of each other about the drive axle 19 as the road wheel 20 is functions as the outmost wheel within the present invention. The road wheel 20 is concentrically mounted around the drive axle 19 so that the rotational energy of the drive shaft can be transferred to the road wheel 20. The motor 16 is operatively coupled with the drive axle 19, wherein the motor 16 rotates the drive axle 19 as the electrical energy is converted into rotational kinetic energy. The rail wheel 21 is concentrically mounted around the drive axle 19 and positioned in between the motor 16 and the road wheel 20, wherein the rail wheel 21 functions as the intermediate wheel within the present invention. The overall diameter of the rail wheel 21 is smaller than the overall diameter of the road wheel 20 so that the first operational mode and the second operational mode can work independent of each other. For example, when the present invention at the first operational mode, the road wheel 20 is able to rotationally engage atop the conventional roadways as the rail wheel 21 does not touch the conventional roadways. When the present invention at the second operational mode, the rail wheel 21 is able to rotationally engage atop the conventional railways or hang from an elevated pair of rails as the road wheel 20 is freely positioned outside of the conventional railways or the elevated pair of rails. Furthermore, the motor 16 for the front left drive system 12 and the rear left drive system 14 are internally mounted to the left section 101 to protect from outside element that can be hazardous. Similarly, the motor 16 for the front right drive system 13 and the rear right drive system 15 are internally mounted to the right section 102 to protect from outside element that can be hazardous. The road wheel 20 and the rail wheel 21 for the front left drive system 12 and the rear left drive system 14 are externally positioned to the left section 101. The road wheel 20 and the rail wheel 21 for the front right drive system 13 and the rear right drive system 15 are externally positioned to the right section 102. due to the external positioning of the rail wheel 21 and the road wheel 20, the present invention can easily transition from the first operational mode to the second operational mode and vise vera.

The motor 16 comprises a stator 17 and a rotor 18 as shown in FIG. 9-12. More specifically, the stator 17 of the front left drive system 12 and the rear left drive system 14 are mounted to the left section 101 in order to secure the front left drive system 12 and the rear left drive system 14 to the present invention and to allow the rotor 18 of the front left drive system 12 and the rear left drive system 14 to convert the electrical energy to rotational kinetic energy. Resultantly, the rotor 18 of the front left drive system 12 is torsionally connected to the drive axle 19 of the front left drive system 12. The rotor 18 of the rear left drive system 14 is torsionally connected to the drive axle 19 of the rear left drive system 14. Then, the rotational energy of the drive shaft with respect to the left section 101 can be selectively transferred to the road wheel 20 or the rail wheel 21. The stator 17 of the front right drive system 13 and the rear right drive system 15 are mounted to the right section 102 in order to secure the front right drive system 13 and the rear right drive system 15 to the present invention and to allow the rotor 18 of the front right drive system 13 and the rear right drive system 15 to convert the electrical energy to rotational kinetic energy. Resultantly, the rotor 18 of the front right drive system 13 is torsionally connected to the drive axle 19 of the front right drive system 13. The rotor 18 of the rear right drive system 15 is torsionally connected to the drive axle 19 of the rear right drive system 15. Then, the rotational energy of the drive shaft with respect to the right section 102 can be selectively transferred to the road wheel 20 or the rail wheel 21. The preset invention can utilize any types of industry standard torsional connections to respectively transfer the rotational kinetic energy of the motor 16 to the road wheel 20 or the rail wheel 21 via the drive axle 19. For example, a direct-drive system, a gear driven system, a chain driven system, a belt driven system, or any other types of related torsional systems.

In reference to the first operational mode, the motor 16 of the front left drive system 12, the front right drive system 13, the rear left drive system 14, and the rear right drive system 15 are powered by the at least one battery 29. Resultantly, the road wheel 20 of the front left drive system 12, the front right drive system 13, the rear left drive system 14, and the rear right drive system 15 are able to drive the present invention on the conventional roadways as an electric vehicle. All of the vehicular electrical systems are controlled/inputted through the control interface 30 while the pod control unit 27 executes the vehicular electrical systems. Preferably, the present is an autonomous electric vehicle when running on the conventional roadways and may further comprise a variety of related components to enable autonomous driving capabilities. For example, the present invention may comprise radar, cameras, Lidar, sonar, GPS, and other necessary sensors and modules.

In reference to the first operational mode, the motor 16 of the front left drive system 12, the front right drive system 13, the rear left drive system 14, and the rear right drive system 15 are powered by the at least one battery 29. Resultantly, the road wheel 20 of the front left drive system 12, the front right drive system 13, the rear left drive system 14, and the rear right drive system 15 are able to hang and drive the present invention on the pair of elevated tracks as an electric vehicle. All of the vehicular electrical systems are controlled/inputted through the control interface 30 while the pod control unit 27 executes the vehicular electrical systems. Preferably, the present is an autonomous electric vehicle when running on the conventional roadways and may further comprise a variety of related components to enable autonomous driving capabilities. For example, the present invention may comprise radar, cameras, Lidar, sonar, GPS, and other necessary sensors and modules.

In reference to the second operational mode, the motor 16 of the front left drive system 12, the front right drive system 13, the rear left drive system 14, and the rear right drive system 15 are powered by an external electrical conduit as the primary power source and the at least one battery 29 as the secondary power source. Resultantly, the rail wheel 21 of the front left drive system 12, the front right drive system 13, the rear left drive system 14, and the rear right drive system 15 are able to drive the present invention on the conventional railways as an electric pod. All of the vehicular electrical systems are controlled/inputted through the control interface 30 while the pod control unit 27 executes the vehicular electrical systems. Preferably, the present is an autonomous electric vehicle when running on the conventional railways and may further comprise a variety of related components to enable autonomous driving capabilities. For example, the present invention may comprise radar, cameras, Lidar, sonar, GPS, and other necessary sensors and modules.

In reference to the second operational mode, the motor 16 of the front left drive system 12, the front right drive system 13, the rear left drive system 14, and the rear right drive system 15 are powered by an external electrical conduit as the primary power source and the at least one battery 29 as the secondary power source. Resultantly, the rail wheel 21 of the front left drive system 12, the front right drive system 13, the rear left drive system 14, and the rear right drive system 15 are able to hang and drive the present invention on an elevated pair of rails as an electric pod. All of the vehicular electrical systems are controlled/inputted through the control interface 30 while the pod control unit 27 executes the vehicular electrical systems. Preferably, the present is an autonomous electric vehicle when running on the conventional railways and may further comprise a variety of related components to enable autonomous driving capabilities. For example, the present invention may comprise radar, cameras, Lidar, sonar, GPS, and other necessary sensors and modules.

Furthermore, the present invention equipped with a plurality of vehicular accessory and safety system such as air conditioning/heating systems, entertaining systems, illuminating systems, a regenerative braking system, traction control systems, an exhaust system, a steering system, a suspension system, and any other types of vehicular related systems that are required and known within the vehicular industry.

Although the invention has been explained in relation to its preferred embodiment, it is to be understood that many other possible modifications and variations can be made without departing from the spirit and scope of the invention as hereinafter claimed.

What is claimed is:

1. A dual mode vehicle that operates on both guided rails and unguided roadways comprising:
   a capsule;
   a carriage;
   a front left drive system;
   a front right drive system;
   a rear left drive system;
   a rear right drive system;
   a pod control unit;
   at least one battery;
   the carriage comprising a spherical frame-housing and a base;
   the front left drive system, the front right drive system, the rear left drive system, and the rear right drive system each comprising a motor, a drive axle, a road wheel, and a rail wheel;
   a spherical cabin of the capsule being attitudinally mounted within the spherical frame-housing;
   the front left drive system and the rear left drive system being mounted to a left section of the base;
   the front right drive system and the rear right drive system being mounted to a right section of the base;
   the road wheel and the rail wheel being axially mounted to the drive axle; and
   the motor being operatively coupled with the drive axle through the at least one battery and the pod control unit.

2. The dual mode vehicle that operates on both guided rails and unguided roadways as claimed in claim 1 comprising:
   the capsule further comprising at least one seat, a first door, and a second door;
   the at least one seat being mounted within the spherical cabin;
   the first door and the second door being hermetically integrated into the spherical cabin; and
   the first door and the second door being diametrically opposed of each other about the spherical cabin.

3. The dual mode vehicle that operates on both guided rails and unguided roadways as claimed in claim 2 comprising:
   the carriage further comprising a third door and a fourth door;
   the spherical cabin being enclosed by the spherical frame-housing;
   the third door and the fourth door being hermetically integrated into the spherical frame-housing; and
   the third door and the fourth door being diametrically opposed of each other about the spherical frame-housing.

4. The dual mode vehicle that operates on both guided rails and unguided roadways as claimed in claim 1 comprising:
   the left section and the right section being externally connected to the spherical frame-housing; and
   the left section and the right section being diametrically opposed of each other about the spherical frame-housing.

5. The dual mode vehicle that operates on both guided rails and unguided roadways as claimed in claim 1 comprising:
   the motor of the front left drive system, the front right drive system, the rear left drive system, and the rear right drive system being electrically connected to the at least one battery; and
   the motor of the front left drive system, the front right drive system, the rear left drive system, and the rear right drive system being electronically connected to the pod control unit.

6. The dual mode vehicle that operates on both guided rails and unguided roadways as claimed in claim 1 comprising:
   the drive axle for the front left drive system and the rear left drive system being rotatably mounted to the left section;

the drive axle for the front right drive system and the rear right drive system being rotatably mounted to the right section;

the motor and the road wheel being oppositely positioned of each other about the drive axle;

the road wheel being concentrically mounted around the drive axle;

the motor being operatively coupled with the drive axle, wherein the motor rotates the drive axle;

the rail wheel being concentrically mounted around the drive axle;

the rail wheel being positioned in between the motor and the road wheel;

the motor for the front left drive system and the rear left drive system being internally mounted to the left section;

the road wheel and the rail wheel for the front left drive system and the rear left drive system being externally positioned to the left section;

the motor for the front right drive system and the rear right drive system being internally mounted to the right section; and the road wheel and the rail wheel for the front right drive system and the rear right drive system being externally positioned to the right section.

7. The dual mode vehicle that operates on both guided rails and unguided roadways as claimed in claim 6 comprising:

the motor comprising a stator and a rotor;

a stator of the front left drive system and the rear left drive system being mounted to the left section;

a stator of the front right drive system and the rear right drive system being mounted to the right section;

a rotor of the front left drive system being torsionally connected to the drive axle of the front left drive system;

a rotor of the rear left drive system being torsionally connected to the drive axle of the rear left drive system;

a rotor of the front right drive system being torsionally connected to the drive axle of the front right drive system; and a rotor of the rear right drive system being torsionally connected to the drive axle of the rear right drive system.

8. The dual mode vehicle that operates on both guided rails and unguided roadways as claimed in claim 1, wherein the motor of the front left drive system, the front right drive system, the rear left drive system, and the rear right drive system is electrically powered from an external electrical conduit.

9. The dual mode vehicle that operates on both guided rails and unguided roadways as claimed in claim 1 comprising:

a three-axis stabilizing unit;

the three-axis stabilizing unit being mounted onto the spherical cabin;

the three-axis stabilizing unit being electrically connected to the at least one battery; and the three-axis stabilizing unit being electronically connected to the pod control unit.

10. The dual mode vehicle that operates on both guided rails and unguided roadways as claimed in claim 1 comprising:

a control interface;

the control interface being mounted within the spherical cabin;

the control interface being electrically connected to the at least one battery; and the control interface being electronically connected to the pod control unit.

11. The dual mode vehicle that operates on both guided rails and unguided roadways as claimed in claim 1 comprising:

a charging port;

the charging port being electrically connected to the at least one battery; and the charging port being electronically connected to the pod control unit.

12. The dual mode vehicle that operates on both guided rails and unguided roadways as claimed in claim 1, wherein the at least one battery is electrically connected to the pod control unit.

* * * * *